United States Patent [19]

Aslin

[11] Patent Number: 5,443,052

[45] Date of Patent: Aug. 22, 1995

[54] FUEL DELIVERY SYSTEM

[76] Inventor: Steven N. Aslin, 10012 N. C475, Wildwood, Fla. 34785

[21] Appl. No.: 361,754

[22] Filed: Dec. 22, 1994

[51] Int. Cl.$^6$ .................. F02M 21/02; F02B 43/08
[52] U.S. Cl. ......................... 123/525; 123/3; 123/575
[58] Field of Search ............. 123/525, 3, 575

[56] References Cited

U.S. PATENT DOCUMENTS

| | | | |
|---|---|---|---|
| 3,788,283 | 1/1974 | Perry | 123/575 |
| 3,985,108 | 10/1976 | Matsomoto et al. | 123/575 |
| 4,319,554 | 3/1982 | Boffie | 123/575 |
| 5,357,908 | 10/1994 | Sung et al. | 123/3 |
| 5,379,728 | 1/1995 | Cooke | 123/3 |

Primary Examiner—Henry C. Yuen
Assistant Examiner—Erick Solis
Attorney, Agent, or Firm—Robert M. Downey

[57] ABSTRACT

A fuel delivery system for an internal combustion engine of an automobile including a fuel tank, a main fuel line and an exhaust line, wherein fuel flows to the engine initially, until the engine heats up, at which point the fuel is directed through an alternate fuel line to an injector nozzle which disperses the fuel through a corrugated steam line within a heat exchanging chamber defined by an enlarged exhaust housing fitted in line along the exhaust line. Fuel in the corrugated steam line is vaporized by the heat of exhaust gases surrounding the steam line within the heat exchanging chamber. A steam trap receives the partially vaporized fuel from the corrugated steam line and separates vapors from liquid fuel condensation, from which the vapors continue along a steam line leading to a shut-off valve. At 60 psi the shut-off valve opens, directing vaporized fuel to a pressure reducer, which reduces pressure of the fuel vapor to 12 psi for delivery to a liquid petroleum gas carburetor structured and disposed to feed the vapor to the fuel intake of the combustion engine. An adapter plate facilitates attachment of the liquid petroleum gas carburetor to the combustion engine and transfer of the vaporized fuel thereto. An auxiliary radiator receives liquid fuel condensation from the steam trap for cooling and return of the liquid fuel to the main fuel line for reuse.

8 Claims, 1 Drawing Sheet

FUEL DELIVERY SYSTEM

BACKGROUND OF THE INVENTION

1. Field of the Invention

This invention relates to a fuel system for internal combustion engines and, in particular, to a fuel delivery supply system for vaporizing fuel and supplying vapors to a combustion engine.

2. Description of the Related Art

It is generally known and recognized in the art that fuel burns more efficiently in an internal combustion engine if it is preheated and vaporized prior to combustion. It has been found that in the vapor state, the burning of fuel in the combustion chambers is more complete, leading to greater fuel economy and lower exhaust emissions. Accordingly, there have been various systems developed which vaporize liquid fuel and mix the fuel vapor with air by means of a vapor carburetor, such as a conventional liquid petroleum gas (LP gas) carburetor in order to operate the internal combustion engine. Many of these systems require the use of electrical heat elements in order to heat the liquid fuel to a temperature sufficient to achieve vaporization. This is normally achieved using the vehicle's electrical power to activate the heat elements. The liquid gasoline is usually vaporized in a chamber containing the electrical heat elements, such that when gas is supplied to the chamber, the heat elements provide sufficient heat to achieve vaporization. An example of such a system is disclosed in U.S. Pat. No. 3,851,633 and U.S. Pat. No. 4,883,616.

Other systems in the related art require specially designed accessory components or attachments which are not of common manufacture, and therefore, not available for mass commercial use. An example of this type of system is disclosed in U.S. Pat. No. 4,494,516 and U.S. Pat. No. 4,249,501.

Further, none of the systems in the prior art provide means for separating vaporized fuel from liquid fuel after heating, wherein the liquid fuel is cooled and subsequently returned to the fuel supply (i.e. gas tank or main fuel line) for reuse.

Accordingly, it is a primary object of the present invention to provide a fuel delivery system for use with an internal combustion engine which provides a simple, efficient method of vaporizing liquid gasoline and delivering the fuel vapor to the combustion chambers of the engine for use during post-warmup operating conditions.

It is yet another object of the present invention to provide a fuel delivery system which effectively reduces the rate of fuel consumption of an internal combustion engine without loss of power.

It is yet another object of the present invention to provide a fuel delivery system which is specifically designed to reduce harmful exhaust emissions by as much as 90%.

It is a further object of the present invention to provide a fuel delivery system for vaporizing fuel and delivering the fuel vapor to the combustion chambers of a combustion engine, wherein the system uses component parts and materials of common manufacture which are readily available in the industry and easily adaptable to an existing combustion engine.

It is a further object of the present invention to provide a fuel delivery system which is specifically adapted for use with an existing internal combustion engine, wherein liquid gasoline is vaporized using the exhaust heat from the engine and further wherein unvaporized fuel is separated from vaporized fuel and cooled for subsequent return to the fuel supply.

It is still a further object of the present invention to provide a fuel delivery supply system including a main fuel line and an alternate fuel, wherein liquid gasoline is delivered to an internal combustion engine for startup and warmup of the engine and further wherein the fuel supply is subsequently transferred to the alternate fuel line and vaporized so that fuel vapor is delivered to the combustion engine during all post-warmup operating conditions.

It is still another object o f the present invention to provide a fuel delivery supply system which is easily and efficiently installed in vehicles having a combustion engine and which includes an electric flow control valve which can be either manually controlled or automatically controlled through the use of sensors and switch devices.

These and other objects and advantages of the present invention will be more readily apparent in the description which follows.

SUMMARY OF THE INVENTION

The supply of fuel to an internal combustion engine normally begins with delivery of liquid gasoline contained in a gas tank and connected by a fuel line to a fuel pump which is further connected by a fuel line to a carburetor or fuel injection system.

The fuel delivery system of the present invention is specifically designed for use in conjunction with the conventional fuel system of an internal combustion engine, either as a retrofit to the existing system, or as a newly manufactured system incorporating the standard component parts of the conventional system.

In accordance with the present invention, liquid gasoline is initially supplied to the engine's conventional carburetor through the main fuel line during startup and warmup procedures. Simultaneously, some of the liquid gasoline is diverted through an alternate fuel line, connecting to a high pressure pump in the main fuel line. The alternate fuel line is further connected to a coiled, corrugated steam line within the exhaust manifold of the exhaust line. The corrugated steam line traveling through the internal chamber of the exhaust manifold is exposed to hot exhaust gases from the engine. As the liquid gasoline travels through the corrugated steam line, the transfer of heat from the hot exhaust gases results in vaporizing of the liquid fuel. The liquid vapors are thereafter directed through a steam line exiting the exhaust manifold to a steam trap, wherein fuel vapors are separated from liquid fuel condensation. The fuel vapors continue through the steam line to a stop valve, which is normally closed during startup and warmup procedures. A pressure sensor in the steam line between the steam trap and stop valve measures pressure of the accumulating vapors. At 60 psi the stop valve is opened and the fuel vapors are released to a pressure regulator connecting to an LP carburetor which is further connected by an adapter plate to the conventional carburetor. The pressure regulator is specifically structured to reduce pressure of the fuel vapors from 60 psi to 12 psi. Simultaneously, the supply of liquid gasoline through the main fuel line to the carburetor is discontinued by use of a shut-off valve.

Another loop in the fuel system is defined by a fuel line extending from the steam trap to a cooling radiator, which is further connected by the fuel line to main fuel line, between the gas tank and the alternate fuel line. Liquid fuel condensation in the steam trap is directed through the fuel line from the steam trap to the cooling radiator where the liquid fuel is cooled and safely returned to the fuel supply for reuse.

BRIEF DESCRIPTION OF THE DRAWINGS

For a fuller understanding of the nature of the present invention reference should be made to the following detailed description taken in connection with the accompanying drawings in which.

Like reference numerals refer to like parts throughout the several views of the drawings.

DESCRIPTION OF THE PREFERRED EMBODIMENT

Figure 1:
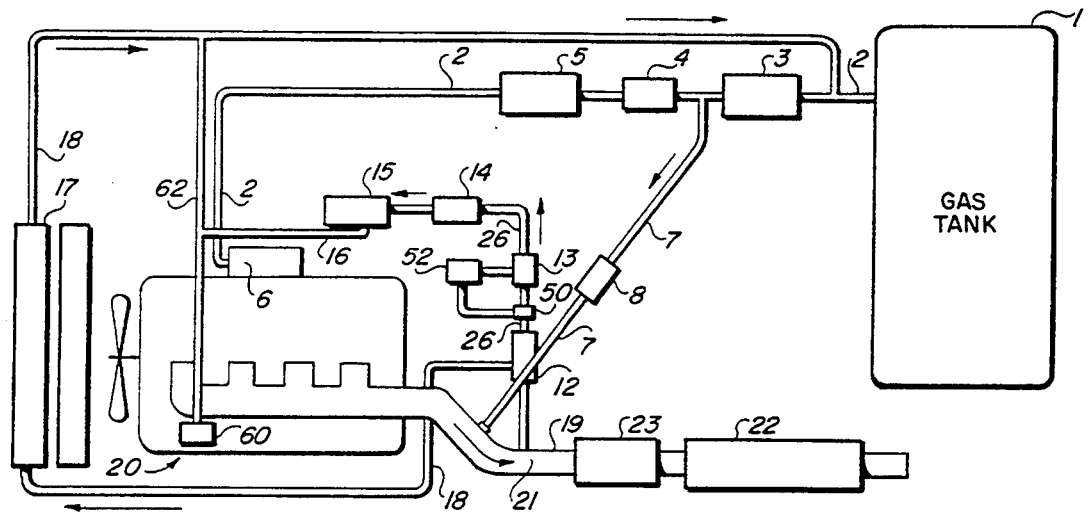
FIG. 1 is a schematic illustration of the fuel delivery system of the present invention shown in use with an internal combustion engine of the type including a carbureted fuel delivery system.

Referring now to FIG. 1, there is shown the fuel delivery system of the present invention used in combination with a conventional internal combustion engine 20 and the conventional fuel delivery system.

The conventional fuel delivery system includes a gas tank 1 and a main fuel line 2 extending from the gas tank 1 to the standard carburetor 6 on the combustion engine 20. An electric fuel pump 5 along the main fuel line 2 delivers gasoline from the gas tank 1 to the carburetor 6.

The conventional exhaust system includes a manifold exhaust pipe 19 interconnecting with exhaust line 21 which leads to a catalytic converter 23 and muffler 22.

The fuel delivery system of the present invention provides a second fuel pump 3, preferably being an electric high pressure fuel pump rated at 60 psi. An electric shut-off valve 4 is further provided on the main fuel line between the high pressure pump 3 and the standard fuel pump 5.

The fuel delivery system of the present invention further includes an alternate fuel line 7 interconnecting at one end to the main fuel line between the shut-off valve 4 and the high pressure fuel pump 3 and leading to the manifold exhaust pipe 19. An electrical shut-off valve 8 is provided along the alternate fuel line 7 and is operable between an open and closed position, much like the shut-off valve 4 on the main fuel line.

Figure 3:
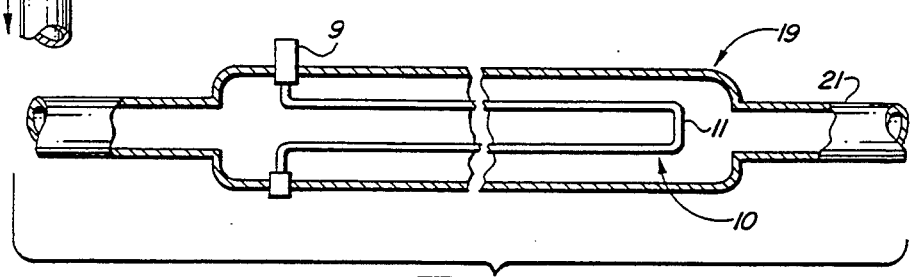
FIG. 3 is an isolated view, in partial section, of an exhaust manifold including the corrugated steam line defining the heat exchanging chamber.

Referring to FIG. 3, there is shown an enlarged section 10 of the manifold exhaust pipe 19, defining a heat exchanging chamber. The enlarged section 10 is generally ½ inch–1 inch greater in diameter than the remainder of the manifold exhaust pipe 19. In accordance with the present invention, there is provided a corrugated steam line 11 which extends throughout the interior of the heat exchanging chamber such that an exterior surface of the corrugated steam line, within the interior chamber, is exposed to hot exhaust gases which travel from the engine through the manifold exhaust pipe 19 and enlarged section 10 to the exhaust pipe 21. An injector plug 9 facilitates vaporization of the fuel by creating a gasoline mist in the corrugated steam line 11. The corrugated steam line 11 may be made of copper, brass or other suitable material adapted to withstand prolonged exposure to the hot exhaust gases while conducting heat for transfer to the interior of the corrugated steam line 11. The steam line 11 exits the heat exchanging chamber 10 and continues to a steam trap 12.

Figure 2:
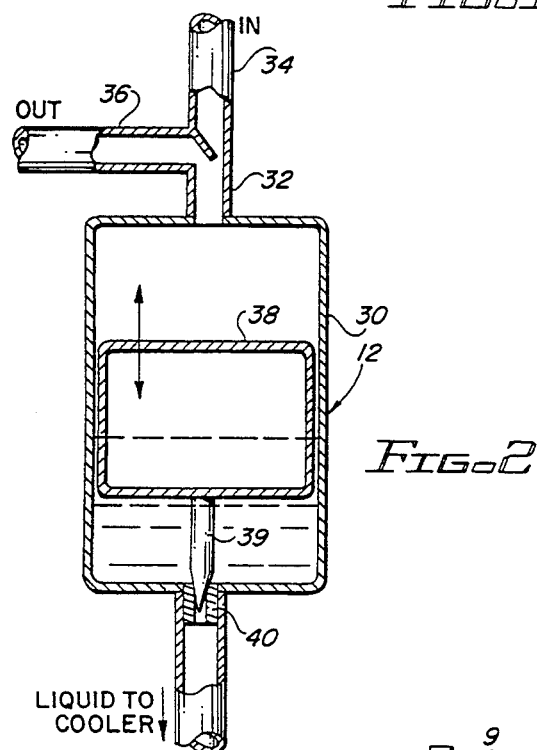
FIG. 2 is an isolated view, in partial section, of a steam trap used in the system of the present invention.

Referring to FIG. 2, the steam trap is illustrated in more detail and includes a housing 30 having a dual passage fitting 32 attached to an upper end including an input 34 and an output 36. A float 38 is further provided within the interior of the housing 30 and includes a stem 39 extending from a bottom thereof which is received within a liquid exit port 40. As the float moves within the interior of the housing 30, the stem 39 moves into and out of blocking engagement within the liquid exit port 40. In this manner, as liquid accumulates within the steam trap 12, the float rises, moving the stem 39 so as to release the accumulated liquid out through the liquid exit port 40. The corrugated steam line leads to the input 34 on the steam trap and connects thereto. A steam line 26 extends from the output 36 on the steam trap 12 and leads to an electric shut-off valve 13. The steam line 26 continues to a gas regulator 14 and a liquid petroleum gas carburetor 15 which is mounted on an adapter plate 16 facilitating interconnection of the LP carburetor to the standard carburetor 6. A temperature sensor 50 is interconnected to the steam line 26 between the shut-off valve 13 and steam trap 12. Control means 52, such as a servo motor or solenoid may be connected to the temperature sensor 50 and electric shut-off valve 13.

A separate loop is defined by a return fuel line 18 which connects to the liquid exit port 40 of the steam trap and leads to a cooling radiator adapted to receive hot liquid fuel therein for cooling. The return line 18 continues from the cooling radiator 17 to the main fuel line 2 between the gas tank 1 and high pressure fuel pump 3.

In operation, liquid gasoline coming from gas tank 1 travels through high pressure fuel pump 3, the shut-off valve 4 and the standard fuel pump 5 for delivery to the carburetor 6 so that the fuel is supplied to the combustion chambers in the combustion engine 20.

Simultaneously, the liquid gasoline is also directed through the alternate fuel line 7. When valve 8 is opened, the gasoline is further able to travel to the corrugated steam line 11 within the heat exchanger where the liquid gasoline is heated to create a fuel vapor which is then lead through the input 34 into the steam trap 12. Fuel vapors and liquid fuel condensation are separated within the steam trap 12, as the fuel vapors escape through output 36 in the top of the steam trap 12, while the liquid fuel condensation settles within the steam trap 12. The fuel vapors continue through the steam line 26 to the shut-off valve 13. During start-up and warm-up procedures, the shut-off valve 13 remains closed as liquid gasoline is supplied through the main fuel line 2 to the carburetor 6.

The pressure sensor 50 monitors the pressure in the steam line 26, as the engine heats up and fuel vapors begin to accumulate in the steam line 26. At 60 psi, the control means 50 operates the shut-off valve 13 to release the fuel vapors through the steam line 26 to the gas regulator.

Simultaneously, or shortly thereafter, the shut-off valve 4 is closed, so that further liquid gasoline is no longer delivered to the carburetor 6. It should be noted that the shut-off valves 4, 8 and 13 can be all manually controlled from within the automobile, such as by controls on the dashboard which interconnect to each of the valves 4, 8, 13 by a mechanical linkage. Alternatively, sensors and electric switching mechanisms, such as the pressure sensor 50 and control means 52, can be used to automatically open and close each of the shut-off valves 4, 8 and 13.

As the fuel vapors enter the gas regulator, the pressure of the vapors is reduced from 60 psi to 12 psi, wherein the lower pressure fuel vapors are thereafter directed to the LP carburetor which delivers the fuel vapors through the adapter plate to the conventional carburetor 6 so that the vapors are received through the air intake of the engine for burning in the combustion chambers. At this point, the engine is operating on fuel vapors. The butterfly plate in the carburetor 6 regulates the ratio of air to vapor entering the combustion chambers.

In the steam trap 12, the unvaporized liquid gasoline and condensations accumulate so as to raise the float 38, and stem 39, opening the liquid exit port so that the liquid gasoline in the steam trap is delivered to the cooling radiator 17 through return line 18. The fuel is cooled in the radiator 17 and then travels through return line 18 to the main fuel line 2 for reuse.

An optional fuel pump 60 may be provided, along with a return line 62 interconnecting between the main fuel line at the carburetor 6 and the return line 18, wherein unused liquid gasoline in the main fuel line 2 can be returned to the high pressure pump 3 once shut-off valve 4 is closed and the engine begins to operate on fuel vapors.

While the invention has been shown and described in what is considered to be a practical and preferred embodiment, it is recognized that departures may be made within the spirit and scope of the following claims which, therefore, should not be limited except within the Doctrine of Equivalents.

Now that the invention has been described, I claim:

1. A fuel delivery system for an internal combustion engine of an automobile of the type including a fuel tank, a main fuel line for transmitting fuel from the fuel tank to the combustion engine and an exhaust line, said apparatus comprising:
    an alternate fuel line connected to the main fuel line and leading to the exhaust line,
    an enlarged exhaust housing fitted in line along the exhaust line and defining a heat exchanging chamber,
    an injector nozzle interconnecting to said alternate fuel line and said enlarged exhaust housing, said injector nozzle being structured to disperse, in a sprayed array, fuel flowing through said alternate fuel line,
    first valve means fitted in line along said alternate fuel line between said main fuel line and said injector nozzle, said first valve means being operable between an open position and a closed position to selectively control flow of the fuel through said alternate fuel line,
    a corrugated steam line extending through said heat exchanging chamber and interconnecting at one end to said injector nozzle, wherein fuel dispersed from said injector nozzle is vaporized by heat transfer from hot exhaust gas in said heat exchanging chamber,
    a steam trap interconnected to an opposite end of said corrugated steam line, externally of said heat exchanging chamber, said steam trap being structured and disposed to separate the vaporized fuel from liquid fuel condensation,
    a liquid petroleum gas carburetor for receiving and directing the vaporized fuel passing therethrough into the combustion engine,
    a vapor line connected between said steam trap and said liquid petroleum gas carburetor for transmitting the vaporized fuel therebetween,
    second valve means interconnected in line along said vapor line and being operable between an open position and a closed position to selectively control flow of the vaporized fuel through said vapor line,
    pressure sensing means along said vapor line between said steam trap and said second valve means for measuring pressure of the vaporized steam therein,
    a pressure reducer interconnected in line along said vapor line between said second valve means and said liquid petroleum gas carburetor for controlling and regulating pressure of the vaporized steam being delivered to said petroleum gas carburetor,
    a high pressure fuel pump along said main fuel line for pumping the fuel through said alternate fuel line at a pressure in the range of 50 psi to 70 psi,
    an auxiliary radiator interconnected to said steam trap for receiving and subsequently cooling the liquid fuel condensation, and
    a return fuel line interconnecting between said auxiliary radiator and said main fuel line for returning cooled, unvaporized fuel to the main fuel line.

2. A fuel delivery system as set forth in claim 1 further including an adapter plate for interconnecting said liquid petroleum gas carburetor to the internal combustion engine, said adapter plate being specifically structured and disposed to receive the vaporized fuel from said liquid petroleum gas carburetor for delivery to the internal combustion engine.

3. A fuel delivery system for an internal combustion engine of an automobile of the type including a carburetor, a fuel tank, a main fuel line for transmitting fuel from the fuel tank to the carburetor and an exhaust line, said apparatus comprising:
    an alternate fuel line connected to the main fuel line and leading to the exhaust line,
    an enlarged exhaust housing fitted in line along the exhaust line and defining a heat exchanging chamber,
    an injector nozzle interconnecting to said alternate fuel line and said enlarged exhaust housing, said injector nozzle being structured to disperse, in a sprayed array, fuel flowing through said alternate fuel line,
    first valve means fitted in line along said alternate fuel line between said main fuel line and said injector nozzle, said first valve means being operable between an open position and a closed position to selectively control flow of the fuel through said alternate fuel line,
    a corrugated steam line extending through said heat exchanging chamber and interconnecting at one end to said injector nozzle, wherein fuel dispersed from said injector nozzle is vaporized by heat transfer from hot exhaust gas in said heat exchanging chamber,
    a steam trap interconnected to an opposite end of said corrugated steam line, externally of said heat exchanging chamber, said steam trap being structured and disposed to separate the vaporized fuel from liquid fuel condensation, a liquid petroleum gas carburetor for receiving and directing the vaporized fuel passing therethrough into the carburetor, a vapor line connected between said steam trap and said liquid petroleum gas carburetor for transmitting the vaporized fuel therebetween, second valve means interconnected in line along said vapor line and being operable between an open position and a closed position to selectively control flow of the vaporized fuel through said vapor line, pressure sensing means along said vapor line between said steam trap and said second valve means for measuring pressure of the vaporized steam therein, an auxiliary radiator interconnected to said steam trap for receiving and subsequently cooling the liquid fuel condensation, and a return fuel line interconnecting between said auxiliary radiator and said main fuel line for returning cooled, unvaporized fuel to the main fuel line.

4. A fuel delivery system as set forth in claim 3 further including an adapter plate for interconnecting said liquid petroleum gas carburetor to the carburetor of the internal combustion engine, said adapter plate being specifically structured and disposed to receive the vaporized fuel from said liquid petroleum gas carburetor for delivery to the air intake passage of the internal combustion engine carburetor.

5. A fuel delivery system as set forth in claim 4 further including a pressure reducer interconnected in line along said vapor line between said second valve means and said liquid petroleum gas carburetor for controlling and regulating pressure of the vaporized steam being delivered to said liquid petroleum gas carburetor.

6. A fuel delivery system as set forth in claim 5 further including a high pressure fuel pump along said main fuel line for pumping the fuel through said alternate fuel line at a pressure in the range of 50 psi to 70 psi.

7. A fuel delivery system as set forth in claim 6 further including control means interconnecting to said pressure sensing means and said second valve means and being structured to operate said second valve to said open position upon pressure of the vaporized fuel reaching 60 psi in said vapor line.

8. A fuel delivery system as set forth in claim 7 wherein said pressure reducer is structured to reduce the pressure of the vaporized fuel being delivered to the liquid petroleum gas carburetor from 60 psi to 12 psi.

* * * * *